Figure 1:
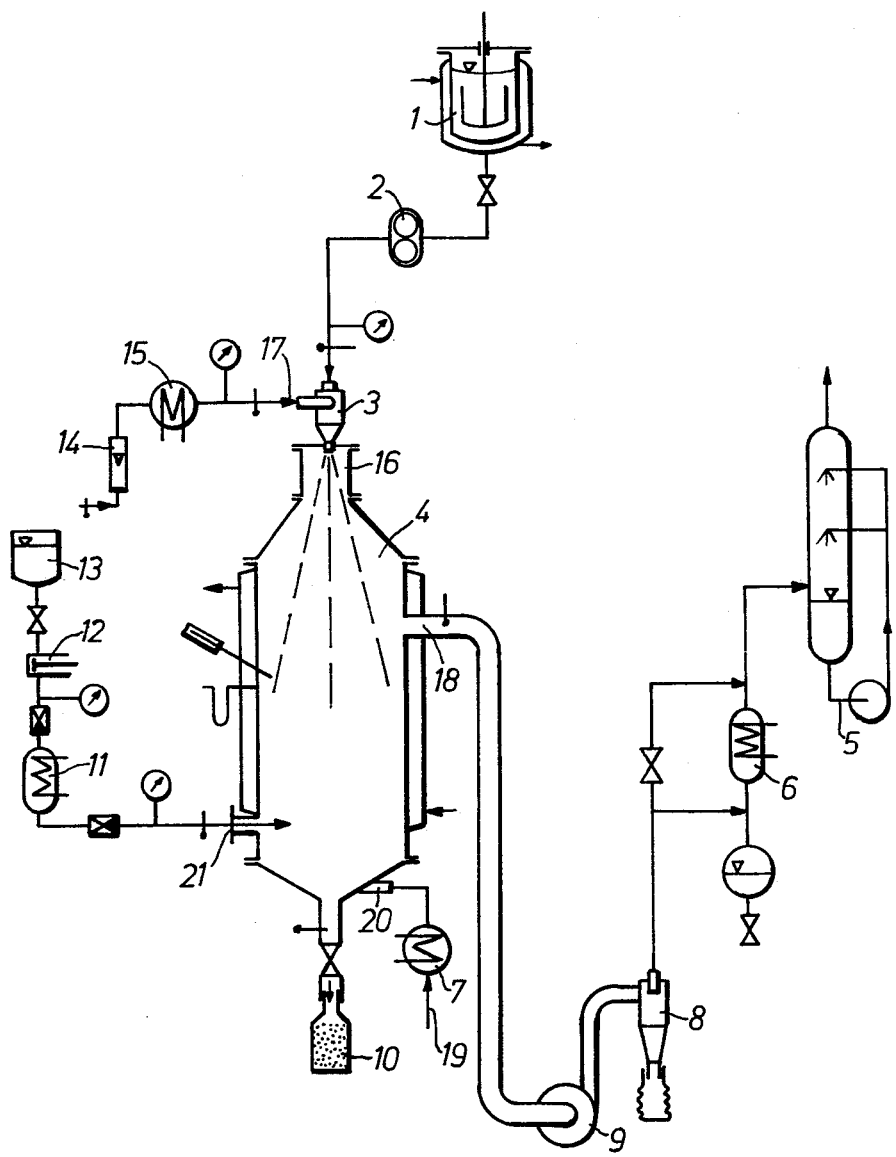

United States Patent [19]

Schnöring et al.

[11] 4,070,346

[45] Jan. 24, 1978

[54] PRODUCTION OF POLYURETHANE POWDER

[75] Inventors: Hildegard Schnöring, Wuppertal-Elberfeld; Bernd Klinksiek, Bensberg-Herkenrath, both of Germany

[73] Assignee: Bayer Aktiengesellschaft, Leverkusen, Germany

[21] Appl. No.: 780,395

[22] Filed: Mar. 23, 1977

Related U.S. Application Data

[63] Continuation of Ser. No. 542,883, Jan. 21, 1975, abandoned.

[51] Int. Cl.² ............................................. C08G 18/08
[52] U.S. Cl. .................. 260/77.5 AA; 260/77.5 AM; 260/77.5 CH
[58] Field of Search .............. 260/77.5 AA, 77.5 AM, 260/77.5 CH

[56] References Cited

U.S. PATENT DOCUMENTS

| | | | |
|---|---|---|---|
| 3,096,001 | 7/1963 | Boe et al. | 260/77.5 AA |
| 3,190,857 | 6/1965 | Fauser et al. | 260/77.5 AA |
| 3,617,367 | 11/1971 | Cummings | 260/77.5 AA |
| 3,652,333 | 3/1972 | Warren | 260/77.5 AA |
| 3,655,627 | 4/1972 | Hutzler et al. | 260/77.5 AA |
| 3,674,720 | 7/1972 | Dunn | 260/77.5 AA |
| 3,817,886 | 6/1974 | McGarr | 260/77.5 AA |
| 3,850,880 | 11/1974 | Hakanson et al. | 260/77.5 AA |
| 3,860,565 | 1/1975 | Barber | 260/77.5 AA |
| 3,868,350 | 2/1975 | Reiff et al. | 260/77.5 AA |
| 3,874,898 | 4/1975 | McInnes et al. | 117/62 |
| 3,894,994 | 7/1975 | Day et al. | 260/77.5 AA |

*Primary Examiner*—M. J. Welsh
*Attorney, Agent, or Firm*—Gene Harsh

[57] ABSTRACT

The instant invention is directed to the production of polyurethane or polyurea powder. The process broadly comprises atomizing an isocyanate, polyisocyanate or isocyanate pre-polymer in the liquid state and bringing the atomized particles into contact with a gaseous diamine or polyamine until they are converted to the solid state.

9 Claims, 1 Drawing Figure

PRODUCTION OF POLYURETHANE POWDER

This is a continuation of application Ser. No. 542,883, filed Jan. 21, 1975, and now abandoned.

BACKGROUND OF THE INVENTION

It is known to produce high-molecular weight polyureas from di- or polyisocyanates or the so-called isocyanate pre-polymers and diamines or polyamines by polyisocyanate polyaddition. It has been attempted to produce these polyureas in the form of fine powders. All methods of producing such powders, however, require the use of auxiliary liquids. For example, an isocyanate prepolymer may be used in organic solvents or the amine may be used in aqueous solution. The powder is always obtained first as a dispersion or suspension in the liquid and must be subsequently isolated and dried.

DESCRIPTION OF THE INVENTION

It is the object of this invention to provide a process by which polyurethane polyureas can be obtained directly in the form of finely divided powders which may also contain other substances enclosed in the powder particles.

The invention therefore relates to a process for the production of polyurethane-polyureas in the form of powders, the particles of which may have other substances enclosed in them, characterized in that a di- or polyisocyanate or an isocyanate prepolymer is converted in the liquid state into small particles. The particles are then brought into contact with a gaseous diamine or polyamine until they have been converted into the solid state by polyisocyanate polyaddition and they are then separated from the gaseous diamine or polyamine.

The amines may be used alone or diluted with an inert gas, in which case the reaction rate can be controlled within wide limits by suitable selection of the amine concentration (i.e., the partial pressure).

The polyisocyanates which may be used in this invention include essentially any diisocyanate and/or polyisocyanate. Suitable materials include: aliphatic, cycloaliphatic, araliphatic, aromatic and heterocyclic polyisocyanates (see Ann. 562, pages 75 to 136); for example, ethylene diisocyanate; tetramethylene-1,4-diisocyanate; hexamethylene-1,6-diisocyanate; dodecane-1,12-diisocyanate; cyclobutane-1,3-diisocyanate; cyclohexyl-1,3- and -1,4-diisocyanate and any mixtures of these isomers; 1-isocyanato-3,3,5-trimethyl-5-isocyanatomethyl-cyclohexane (German Auslegeschrift No. 1,202,785); hexahydrotolylene-2,4- and -2,6-diisocyanate and any mixtures of these isomers; hexahydrophenylene-1,3- and/or 1,4-diisocyanate; perhydro-2,4'- and/or -4,4'-diisocyanate; phenylene-1,3- and -1,4-diisocyanate; tolylene-2,4- and -2,6-diisocyanate and any mixtures of these isomers; diphenylmethane-2,4'- and/or -4,4'-diisocyanate; naphthylene-1,5-diisocyanate; triphenylmethane-4,4',4''-triisocyanate; polyphenyl-polymethylene polyisocyanates (obtained by aniline-formaldehyde condensation followed by phosgenation in accordance with British patent specification Nos. 874,430 and 848,671); perchlorinated aryl polyisocyanates (see German Auslegeschrift No. 1,157,601); polyisocyanates which contain carbodiimide groups (see German Pat. No. 1,092,007); the diisocyanates according to U.S. Pat. No. 3,492,330; polyisocyanates which contain allophanate groups (see British patent specification No. 994,890; Belgian Pat. No. 761,626 and Dutch patent application No. 7,102,524); polyisocyanates which contain isocyanurate groups (see German Pat. Nos. 1,022,789; 1,222,067 and 1,027,394; German Offenlegungsschriften Nos. 1,929,034 and 2,004,048); polyisocyanates which contain urethane groups (see Belgian Pat. No. 752,261; U.S. Pat. No. 3,394,164); polyisocyanates which contain acylated urea groups (see German Pat. No. 1,230,778); polyisocyanates which contain biuret groups (see German Pat. No. 1,101,394; British patent specification No. 889,050 and French Pat. No. 7,017,514); polyisocyanates prepared by telomerization reactions (see Belgian Pat. No. 723,640); polyisocyanates which contain ester groups (see British patent specification Nos. 956,474 and 1,072,956; U.S. Pat. No. 3,567,763 and German Pat. No. 1,231,688) and reaction products of the above mentioned isocyanates with acetals (see German Pat. No. 1,072,385).

Isocyanate prepolymers, as is recognized in the art, are the reaction products of a stoichiometric excess of the above mentioned polyisocyanates with compounds of an average molecular weight of about 1000 to about 10,000 which contain at least two hydroxyl groups, preferably terminal hydroxyl groups. These reaction products contain free isocyanate groups, preferably terminal isocyanate groups, and react as polyisocyanates.

Hydroxyl compounds which are particularly suitable for producing the isocyanate prepolymers have a molecular weight of 400 to 10,000, preferably 1000 to 10,000, and contain from 2 to 8 hydroxyl groups per molecule. Polyesters, polyethers, polythioethers, polyacetals, polycarbonates and polyester amides are particularly suitable. Polyesters which are suitable for this purpose include the reaction products of polyhydric alcohols, preferably dihydric alcohols to which trihydric alcohols may be added and polybasic, preferably dibasic, carboxylic acids. Instead of preparing the polyesters from free polycarboxylic acids, the corresponding polycarboxylic acid anhydrides or corresponding polycarboxylic acid esters of lower alcohols or mixtures thereof may be used. The polycarboxylic acids may be aliphatic, cycloaliphatic, aromatic and/or heterocyclic and may be substituted, e.g. by halogen atoms and/or unsaturated. The following are mentioned as examples: succinic acid; adipic acid; suberic acid; azelaic acid; sebacic acid; phthalic acid; isophthalic acid, trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; dimethyl terephthalate and bis-glycol terephthalate. Suitable polyhydric alcohols are e.g. ethylene glycol; propylene-1,2- and -1,3-glycol; butylene-1,4- and -2,3-glycol; hexane-1,6-diol; octane-1,8-diol; neopentyl glycol; cyclohexane dimethanol (1,4-bis-hydroxymethyl-cyclohexane); 2-methylpropane-1,3-diol; glycerol; trimethylolpropane; hexane-1,2-6-triol; butane-1,2,4-triol; trimethylolethane; pentaerythritol; quinitol; mannitol and sorbitol; methyl glycoside; polyethylene glycols; dipropylene glycol; polypropylene glycols; dibutylene glycol and polybutylene glycols. The polyesters may also contain a proportion of carboxyl end groups. Polyesters of lactones such as ε-caprolactone or hydroxy carboxylic acids such as ω-hydroxycaproic acid may also be used.

Examples of suitable polyethers containing from 2 to 8, preferably 2 or 3, hydroxyl groups can be obtained e.g. by polymerizing epoxides such as ethylene oxide; propylene oxide; butylene oxide; tetrahydrofuran; styrene oxide or epichlorohydrin; each with itself, for example in the presence of boron trifluoride, or by the addition of these epoxides, either as mixtures or successively, to starting components which contain reactive hydrogen atoms such as alcohols or amines, e.g. water; ethylene glycol; propylene-1,3- or -1,2-glycol; trimethylolpropane; 4,4'-dihydroxydiphenylpropane; aniline; ammonia; ethanolamine or ethylene diamine. Sucrose polyethers such as those described in German Auslegeschriften Nos. 1,176,358 and 1,064,938, for example, may also be used according to the invention. It is frequently preferred to use polyethers which contain predominantly primary hydroxyl groups (up to 90% by weight, based on all the hydroxyl groups present in the polyether). Polyethers modified by vinyl polymers such as can be obtained, for example, by polymerizing styrene or acrylonitrile in the presence of polyethers (U.S. Pat. Nos. 3,383,351; 3,304,273; 3,523,093 and 3,110,695 and German Pat. No. 1,152,536) and polybutadiene which contain hydroxyl groups are also suitable.

Among the polythioethers should be mentioned in particular the condensation products of thiodiglycol with itself and/or with other glycols, dicarboxylic acids, formaldehyde, aminocarboxylic acids or amino alcohols. The products obtained are either polythio mixed ethers, polythio ether esters or polythio ether ester amides, depending on the cocomponents.

Suitable polyacetals include e.g. the compounds which can be prepared from glycols such as diethylene glycol, triethylene glycol, 4,4'-dioxyethoxy-diphenyl dimethylmethane, hexane diol and formaldehyde. Polyacetals suitable for the purpose of the invention can also be prepared by the polymerization of cyclic acetals.

The polycarbonates with hydroxyl groups may be of the kind known per se which can be obtained e.g. by reacting diols such as propane-1,3-diol, butane-1,4-diol and/or hexane-1,6-diol, diethylene glycol, triethylene glycol or tetraethylene glycol with diaryl carbonates such as diphenyl carbonate or phosgene.

The polyether amides and polyamides include e.g. the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups as well as modified or unmodified natural polyols such as castor oil, carbohydrates or starch may be used. The addition products of alkylene oxides with phenol formaldehyde resins or with urea formaldehyde resins may also be used according to the invention.

Representatives of these compounds which may be used according to the invention have been described e.g. in High Polymers, Volume XVI, "Polyurethanes, Chemistry and Technology", published by Saunders-Frisch, Interscience Publishers, New York, London, Volumn I, 1962 pages 32 - 42 and pages 44 - 54 and Volume II, 1964, pages 5 - 6 and 198 and 199, and in Kunststoff-Handbuch, Volume VII, Vieweg-Höchtlen, Carl-Hanser-Verlag, Munich, 1966, e.g. on pages 45 to 71.

The preparation of isocyanate prepolymers from polyols and isocyanates is already known (see R. Vieweg, A. Höchtlen, Kunststoff-Handbuch, Volume VII, Polyurethane, Carl-Hanser-Verlag, Munich 1966, pages 84–85).

Diamines or polyamines for the purpose of this invention are preferably aliphatic diamines, in particular alkylene diamine containing 2 to 8 carbon atoms in the alkylene group, such as ethylene diamine or propylene diamine or polyalkylene polyamines such as dialkylene triamines or trialkylene tetramines, the alkylene groups preferably containing 2 to 8 carbon atoms. Diethylene triamine, triethylene tetramine and ethylene diamine are examples with ethylene diamine being preferred.

The process according to the invention will now be described in more detail with reference to a preferred embodiment.

A di- or polyisocyanate or an isocyanate prepolymer is heated to a temperature above its melting point but below its decomposition point so that it is provided in a liquid state. This liquid is then atomized into very fine particles by a suitable atomizer and introduced into a reactor, preferably a tubular reactor, which is filled with gaseous diamine or polyamine or a mixture of inert gas and amine. The temperature in the reactor should be above the boiling point of the amine or the dew point of the amine (if an inert carrier gas is added), and above the melting point of the isocyanate or isocyanate prepolymer but below its decomposition point. The liquid particles of isocyanate-containing compounds remain in contact with gaseous amine until they have been solidified by polyaddition, and they are then removed from the reactor. They immediately have the properties of a pourable powder.

A particularly rapid reaction is obtained if the di- or polyisocyanate or isocyanate prepolymer is introduced into the reactor at a temperature below the dew point of the mixture of amine and inert gas. The amine in that case condenses on the atomized particles. Condensation ceases when the surface of atomized particles has been heated to the dew point.

Condensation of the amine may also be controlled by arranging zones of differing temperatures in the reactor. For example, at the point of inlet of the isocyanate or isocyanate prepolymer particles, the reactor may be at a temperature slightly above the dew point, in the main part at a higher temperature and close to the outlet again at a temperature slightly above the dew point. In that case amine first condenses on the particles, the unreacted portion evaporates again and the particles cool slightly but cannot cake together.

The temperature in the reactor is generally influenced by the temperature of the components which are introduced, the heat evolved during the reaction, and by heating or cooling the housing of the reactor. Generally to start the reaction, it is useful to heat the reactor. Once reaction begins, external heating may be stopped and, in fact, it might even be necessary to cool the reactor.

When using zones of differing temperatures, the inlet zone generally comprises from about 10 to about 20 percent of the total height of the reactor the main zone generally comprises from about 60 to about 80 percent, and the outlet zone again generally comprises from about 10 to about 20 percent. However, as hereinbefore indicated, it is also possible to maintain the reactor at an essentially uniform and constant temperature.

In general, the temperature difference between the temperature at the inlet of the reactor and the boiling point or dew point is not critical. In practice, it depends on the reactivity of the isocyanate used. If compounds with reactive aromatic NCO-groups are used, the difference will generally be 10° C or more to avoid a too rapid reaction before the isocyanate has been sufficiently dispersed. On the other hand, where slowly reacting isocyanates are used, the difference will generally be 5° C or less in order to obtain a stable powder within a reasonable stay of time in the reactor.

Since the boiling point or dew point of the amine depend on the pressure, condensation of the amine may also be adjusted by the pressure in the reactor. It is advantageous to employ a pressure slightly below atmospheric pressure, about 720–750 Torr, but an even lower pressure or even a pressure in excess of atmospheric pressure may be employed.

A continuously operating apparatus for carrying out the process is shown in FIG. 1. It consists of a tubular reactor 4 fitted at its top end with a spray nozzle 3 which is connected to the storage vessel 1 by way of a pump 2 and to a gas conduit 17. The gas enters the nozzle through the flowmeter 14 and gas heater 15. An inspection glass 16 is provided at the top of the reactor so that the atomization process can be kept under observation. In the lower part of the reactor is a first lateral attachment 21 which is connected to another storage vessel 13 by way of the evaporator 11 and pump 12. There is also a second lateral attachment 20 which is connected to a heater 7 into which gas can be introduced through a pipe 19. A third lateral attachment 18 in the upper part of the reactor is connected to a scrubber 5 by way of a blower 9, cyclone 8 and cooler 6. A collector 10 is provided at the bottom of the reactor.

To carry out the process, an isocyanate prepolymer or a di- or polyisocyanate is introduced into the storage vessel 1 and heated to a temperature at which it is liquid. This product is supplied to the sprayer 3 by the pump 2 and at the same time an inert gas, e.g. nitrogen, is injected into the sprayer from pipe 17. A mist of isocyanate prepolymer or di-polyisocyanate is then formed in reactor 4. At the same time, a diamine or polyamine from storage vessel 13 is introduced into the evaporator 11 by the pump 12, gasified in the evaporator and also introduced into the reactor. The mist of isocyanate or isocyanate prepolymer introduced in the opposite direction to the amine vapor reacts by a polyisocyanate polyaddition reaction to form a polyurethand/polyurea. A small portion of this polyurea is removed from the reactor by way of the blower 9 and cyclone 8 and the separated stream of gas is processed in the cooler 6 and scrubber 5. The major portion of polyurea powder is removed at the bottom of the reactor. Inert gas, e.g. preheated nitrogen, can be introduced into the reactor through the pipe 19 and heating device 7. This hot nitrogen heats the reactor to the reaction temperature before the start of the reaction, and when the addition of isocyanate or isocyanate prepolymer and amine is terminated, the reactor is blown out by the nitrogen to empty it.

Polyaddition, e.g. to polyurethane-polyurea, thus takes place while the atomized isocyanate or isocyanate prepolymer is airborne. The operating temperature of the reactor depends on the starting materials used but should preferably be above the boiling point of the amine used or the dew point of the mixture of amine and gas.

It is particularly advantageous to employ reaction temperatures of from about 50° to about 150° C. At its entry into the reactor, the isocyanate prepolymer is preferably at a temperature of from about 20° to about 120° C and the ethylene diamine gas at a temperature of from about 120° to about 140° C.

The amine is generally used in excess. The necessary time of stay (airborne time) of the isocyanate prepolymer particles may range from fractions of a second to several minutes. The time required depends on the reaction temperature, the size of the particles and the relative quantity of amine. It can be shortened if the amine is allowed to condense on the particles. The time of stay also depends on the nature of the isocyanate or isocyanate prepolymer and the nature of the desired end product. Generally, the time of stay is determined experimentally for individual components. In general, by decreasing the isocyanate or isocyanate prepolymer particle size and/or by utilizing more reactive isocyanate or isocyanate prepolymer and/or amine, and/or by increasing the relative quantity of amine and/or by increasing the temperature, the time of stay required will be decreased.

The reaction may be continued until complete polyisocyanate polyaddition has been achieved. Compact pulverulent particles of polyurethane-polyurea are then obtained. Alternatively, the reaction may be stopped when the particles have only formed a solid outer envelope of polyurethane-polyurea. If these particles are immediately removed from the reactor, they still contain unreacted isocyanate or isocyanate-containing compounds in the interior. In other words, capsules consisting of a polyurethane-polyurea covering and a core of isocyanate or isocyanate prepolymer are produced which are storage-stable, pourable, and solid.

Capsules of this kind which have a liquid contained therein are always obtained if the time of stay in the reactor is short in proportion to the diameter of the particles. The reaction in the interior of the particles is inhibited by the diffusion resistance afforded by the polyurethane-urea covering already formed.

If it is desired to obtain particles which contain polyurethane in the interior instead of a completely reacted polyuea, the isocyanate-containing prepolymers or isocyanates may be mixed with a slowly reacting chain-lengthening agent such as 1,4-butylene glycol and this mixture may then be atomized and subjected to the amine-containing atmosphere. Since the reaction with amine is practically spontaneous on the surface of the individual particles, a polyurea covering is formed round a core of polyurethane.

Any other substances which do not take part in the polyisocyanate polyaddition reaction may also be added to the isocyanate or isocyanate prepolymer. These substances then become encapsulated inside the polyurethane-polyurea particles or embedded in a matrix of polyuethane or polyurea/polyurethane. Such material is suitably dissolved or dispersed in the isocyanate or isocyanate prepolymer before the beginning of the reaction, and the small particles are formed from the resulting mixture and exposed to gaseous amine. Any liquid and solid particles which are inert in the reaction are in principle suitable for encapsulating. For example, water-soluble salts such as phosphates, nitrates, chlorides, etc. as well as, for example, any water-soluble or insoluble components of a mineral fertilizer or phosphoric acid ester, e.g. insecticides and pesticides, ethereal, vegetable and synthetic oils and organic solvents may be used.

Where used, the quantity of encapsulated substance will generally be for 1 to 95 percent by weight, based on the isocyanate or isocyanate prepolymer. The mixture must be of a suitable consistency for delivery through pipes and atomization apparatus.

The size of the resulting particles of polyurethane-urea powder depends on the degree of atomization of the isocyanate or isocyanate prepolymer. It may vary from about 1.0 $\mu$ to about 1000 $\mu$ and is preferably from 10 to 100 $\mu$.

EXAMPLE 1

An isocyanate prepolymer which contains 20% of free isocyanate groups (which has been obtained by reacting 339 parts by weight of a trifunctional polyether of glycerol, propylene oxide and ethylene oxide having a molecular weight of 6000 and a hydroxyl number of 28 with 461 parts by weight of hexametylene-1,6-diisocyanate at 100 to 105° C for a period of 5 hours) is continuously injected at a temperature of 10° C into a heated reactor as shown in FIG. 1 (diameter 600 mm, height 3 m) through a two-material nozzle at a rate of 18 kg/hour.

The isocyanate prepolymer is pumped from a storage tank by a gear wheel feed pump and mixed with 8.6 mm³/hr of nitrogen at 20° C in a two-material nozzle. In the lower part of the reactor, 2.3 kg/hr of ethylene diamine are introduced from a storage tank by way of a piston feed pump and evaporator. On leaving the evaporator, the gaseous ethylene diamine is at a temperature of 138° C. The temperature at the head of the reactor is 58° C, in the main part of the reactor 110° C and at the base of the reactor 80° C. The pressure in the reactor is 749 Torr.

In the top of the reactor, ethylene diamine condenses on the cold prepolymer particles so that the reaction begins there. The temperature difference between the temperature in the head of the reactor and the dew point of the amine-nitrogen mixture is 1° C. During the subsequent time of stay in the main body of the reactor, the atomized particles, or at least their surface, become heated to a temperature above the dew point and any amine still adhering to the particles is distilled off.

A fluid powder of fine, spherical particles is removed at the foot of the reactor. The particles still contain unreacted prepolymer in the interior. The total free isocyanate group content of the capsules is 12% by weight, i.e. 40% of the isocyanate groups provided have reacted with amine. The free isocyanate groups are preserved over a storage time of many weeks.

The gas mixture passes through the blower and cyclone to the cooler where the remaining ethylene diamine is condensed. The remaining gas is then released to the atmosphere through the scrubber.

EXAMPLES 2 - 7

The experiments were carried out by the method described in Example 1. Table 1 shows the reaction conditions and results.

TABLE 1

| Example | 2 | 3 | 4 | 5 | 6 | 7 |
|---|---|---|---|---|---|---|
| Throughput rate/isocyanate prepolymer (kg/h) | 18 | 18 | 18 | 18 | 18 | 18 |
| Temperature/isocyanate prepolymer (° C) | 30–35 | 50–60 | 10 | 50–60 | 56 | 20 |
| Throughput rate/nitrogen (Nm³/h) | 8.6 | 8.6 | 9.45 | 8.65 | 8.65 | 7.45 |
| Temperature/nitrogen (° C) | 20 | 20 | 92 | 240 | 248 | 20 |
| Throughput rate/ethylene diamine (kg/h) | 2.3 | 2.3 | 2.3 | 2.3 | 2.3 | 3 |
| Temperature/ethylene diamine (° C) | 138 | 138 | 138 | 138 | 138 | 138 |
| Temperature/reactor head (° C) | 58 | 58 | 55 | 74 | 86 | 58 |
| Temperature/reactor body (° C) | 110 | 110 | 102 | 121 | 126 | 110 |
| Temperature/reactor base (° C) | 82 | 82 | 80 | 80 | 83 | 80 |
| Pressure of reactor (Torr) | 749 | 749 | 740 | 740 | 753 | 749 |
| Isocyanate content of capsules (%) | 7.5 | 5.8 | 16.8 | — | — | 11 |
| Reacted isocyanate groups (%) | 62.5 | 71 | 16.0 | — | — | 45 |
| Difference between temperature at head of reactor and dew point (° C) | +1 | +1 | +0.5 | +14 | +29 | −6 |
| Remarks | fine spherical powder | fine spherical powder | fibrous particles | no reaction | no reaction | coarse fibrous particles |

EXAMPLE 8

In Examples 5 and 6, the conditions were chosen so that condensation of amine is not possible. No reaction takes place. The experiments were repeated under otherwise identical conditions but using a reactor with a height of 20 m:

| | |
|---|---|
| Throughput rate of prepolymer | 12 kg/h at 70° C |
| Throughput rate of nitrogen | 10 Nm³/h from 80° C |
| Throughput rate of ethylene diamine | 1.7 kg/h from 138° C |

The temperature in the main part of the reactor: 100° C, reactor pressure: 760 Torr.

The reaction takes place while the atomized particles are in the airborne phase.

A very fine, spherical, fluid powder is continuously removed from the reactor. The particles still contain unreacted prepolymer in the interior. Their free isocyanate group content is 10%, i.e. 50% of the isocyanate grups have been reacted.

EXAMPLE 9

18 kg/hr of hexamethylene-1,6-diisocyanate (Desmodur H) containing 44% of free isocyanate groups are continuously injected into the reactor according to Example 1 and FIG. 1.

| | |
|---|---|
| Temperature of hexamethyl-1,6-diisocyanate: | 10° C |
| Throughput rate of ethylene diamine | 2.3 kg/h |
| Inlet temperature of ethylene diamine | 138° C |
| Throughput rate of nitrogen | 8.65 Nm³/h |
| Temperature of nitrogen | 10° C |
| Temperature at head of reactor | 66° C |
| Temperature of body of reactor | 116° C |
| Temperature at foot of reactor | 58° C |
| Reactor pressure | 740 Torr |

Chain-lengthening already takes place in the head of the reactor by condensation of ethylene diamine on the cold particles of isocyanate. The difference between the temperature at the head of the reactor and the dew point is 10° C.

A fine, not very fluid powder of spherical particles is removed from the foot of the reactor. The particles still contain liquid isocyanate in their interior. Based on the whole capsule, the free isocyanate group content is 22.8%, i.e. 48.2% of the isocyanate groups have reacted with amine.

EXAMPLE 10

18 kg per hour of the diphenylmethane-4,4'-diisocyanate (Desmodur 44) containing 32% of free isocyanate groups ar injected analogously to Example 9:

| | |
|---|---|
| Atomization temperature of diphenylmethane-4,4'-diisocyanate | 60° C |
| Throughput rate of ethylene diamine | 2.3 kg/h |
| Inlet temperature of ethylene diamine | 138° C |
| Throughput rate of nitrogen | 10.25 Nm³/h |
| Inlet temperature of nitrogen | 195° C |
| Temperature at head of reactor | 65° C |
| Temperature in body of reactor | 100° C |
| Temperature at foot of reactor | 52° C |
| Reactor pressure | 744 Torr |

Chain-lengthening takes place as a gas phase reaction while the atomized particles are airborne. A fine powder of spherical particles containing unreacted isocyanate in their interior is removed from the foot of the reactor. The free isocyanate group content is 16%, which meeans that 50% of the isocyanate groups have undergone chain-lengthening.

EXAMPLE 11

Same arrangement of experiment, prepolymer and experimental conditions as in Example 1.

A mixture of 50 parts of prepolymer and 50 parts of fertilizer powder is prepared in the prepolymer storage tank. A pourable product with a concentration of 50% in the outer covering is obtained. The capsules, which in this example are solid in the interior, are similar in size and shape to the fertilizer used and have a delayed release action.

EXAMPLE 12

Same conditions as in Example 1. A mixture of 50 parts of Dipterex and 50 parts of prepolymer is introduced into the storage tank. The micro capsules obtained are pourable.

EXAMPLE 13

Same experimental conditions as in Example 11. A mixture of 50 parts of aluminum hydroxychloride and 50 parts of prepolymer is introduced into the storage tank. The micro capsules obtained are pourable.

EXAMPLE 14

Same experimental conditions as in Example 11 but a mixture of 30 parts by weight of dichlorophenyl phosphate and 70 parts of prepolymer is introduced into the storage tank. The free-flowing micro capsules obtained contain dichlorophenyl phosphate in the interior.

What is claimed is:

1. An interface polyaddition process for producing polyurethane polyurea in the form of powder, the particles of which may contain other substances enclosed in them, comprising converting a polyisocyanate into small particles in the liquid state, bringing the particles into contact with a gaseous diamine or polyamine until they have been converted into the solid state by polyisocyanate-polyaddition, and separating the said product from the gaseous diamine or polyamine.

2. An interface polyaddition process according to claim 1 wherein a mixture of an inert carrier gas and gaseous diamine or polyamine is used.

3. The process of claim 2, wherein said polyisocyanate is supplied at a temperature below the dew point of said mixture.

4. The process of claim 2, wherein said polyisocyanate is supplied at a temperature above the dew point of said mixture.

5. The process of claim 1, wherein the contact with gaseous diamine or polyamine is stopped as soon as the polyisocyanate particles have formed a solid covering.

6. The process of claim 1, wherein an inert solid or liquid substance is added to the polyisocyanate.

7. The process of claim 1, wherein slowly reacting chain-lengthening agents are added to the polyisocyanate before the conversion into small particles in the liquid state and the said polyisocyanate is brought into contact with only sufficient diamine or polyamine to enable a solid covering to be formed.

8. The process of claim 1, wherein said polyisocyanate is a diisocyanate.

9. The process of claim 1, wherein said polyisocyanate is an isocyanate prepolymer.

* * * * *